(12) United States Patent
Baumann et al.

(10) Patent No.: US 12,478,815 B2
(45) Date of Patent: Nov. 25, 2025

(54) FIRE PROTECTION SYSTEMS FOR ROOFTOP SOLAR PANEL INSTALLATIONS, METHODS AND WATER SPRAY NOZZLES THEREFOR

(71) Applicant: Minimax Viking Patent Management GmbH, Bad Oldesloe (DE)

(72) Inventors: Georg Baumann, Lübeck (DE); Sven Stenke, Lübeck (DE); Thorsten Gieseke, Großhandsdorf (DE); Björn Schmidt, Reinfeld (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

(21) Appl. No.: 18/764,661

(22) Filed: Jul. 5, 2024

(65) Prior Publication Data

US 2025/0065166 A1 Feb. 27, 2025

(30) Foreign Application Priority Data

Aug. 24, 2023 (EP) ..................................... 23193334

(51) Int. Cl.
*A62C 35/68* (2006.01)
*A62C 31/02* (2006.01)
*A62C 37/08* (2006.01)

(52) U.S. Cl.
CPC .............. *A62C 35/68* (2013.01); *A62C 31/02* (2013.01); *A62C 37/08* (2013.01)

(58) Field of Classification Search
CPC ......... A62C 35/68; A62C 31/20; A62C 37/08; A62C 3/0214
See application file for complete search history.

(56) References Cited

U.S. PATENT DOCUMENTS 3,990,518 A 11/1976 Hemme
7,909,111 B1 3/2011 Hinojosa et al.
(Continued)

FOREIGN PATENT DOCUMENTS

CN 213 252 709 5/2021
DE 24 23 447 11/1975
(Continued)

OTHER PUBLICATIONS

European Patent Office, Extended European Search Report for EP 23193334.2, May 16, 2024, 16 pages.
(Continued)

*Primary Examiner* — Tuongminh N Pham
(74) *Attorney, Agent, or Firm* — Perkins Coie LLP

(57) ABSTRACT

Fire protection systems for a rooftop solar panel installation with solar panels. The fire protection system has a group of water spray nozzles with a metric K-factor of 20 or less to discharge firefighting fluid to a coverage area of the rooftop solar panel installation, a fluid pipe system connecting the group of water spray nozzles to a fluid supply for providing firefighting fluid, a fire hazard detection system with at least one fire hazard detector configured to monitor the coverage area, and at least one detection control unit to generate an alarm signal upon detection of a fire hazard within the coverage area, a valve unit configured to control passage of the firefighting fluid from the fluid supply, wherein the coverage area is at least 500 m$^2$, and the group of water spray nozzles is configured to discharge the firefighting fluid received from the fluid supply to the coverage area with a normalized fluid application rate of 15 mm/m$^2$/min or less.

26 Claims, 4 Drawing Sheets

(56) References Cited

U.S. PATENT DOCUMENTS

| | | | |
|---|---|---|---|
| 11,027,159 B2 | 6/2021 | Kim et al. | |
| 2005/0199748 A1* | 9/2005 | Heil | A62C 35/58 |
| | | | 239/208 |
| 2020/0179736 A1* | 6/2020 | Verschoor | A62C 35/68 |
| 2023/0398391 A1* | 12/2023 | Owsley | A62C 3/0214 |

FOREIGN PATENT DOCUMENTS

| | | |
|---|---|---|
| DE | 69217502 | 5/1997 |
| DE | 10 2010 050589 | 5/2012 |
| DE | 202019107099 | 1/2020 |
| EP | 2750770 | 7/2014 |
| EP | 3 613 471 | 2/2020 |
| KR | 101 279 525 | 7/2013 |
| WO | WO0200303 | 1/2002 |
| WO | WO2005042105 | 5/2005 |
| WO | WO 2021/160890 | 8/2021 |

OTHER PUBLICATIONS

The Viking Corporation, Technical Data, Model C-1 Window Sprinklers, Form No. F_051800, Nov. 18, 2005, 6 pages.
Zurich Resilience Solutions, "Photovoltaikanlagen auf Industrie- und Gewerbebauten", 2023, 49 pages.

* cited by examiner

FIRE PROTECTION SYSTEMS FOR ROOFTOP SOLAR PANEL INSTALLATIONS, METHODS AND WATER SPRAY NOZZLES THEREFOR

PRIORITY CLAIM AND INCORPORATION BY REFERENCE

This application claims the benefit of European Application No. 23193334.2 filed Aug. 24, 2023, which is incorporated by reference in its entirety.

TECHNICAL FIELD

The present invention relates generally to rooftop solar panel installations, fire protection systems for rooftop solar panel installations, methods and water spray nozzles therefor.

BACKGROUND OF THE INVENTION

Rooftop solar panel installations are becoming more prevalent recently on private, commercial or industrial buildings due to an increased demand of local regenerative power supply. Vast arrays of solar panels are installed on large roof areas of factory buildings, storage houses or office complexes, typically segmented into several smaller arrays each spanning several hundreds of square meters. Each array requires extensive electrical wiring on the roof itself, which together with flammable roof insulation creates a significant fire hazard. Nonetheless, in most countries building codes and fire protection standards do not demand specific fire protection systems for roofs and rooftop installations like solar panel arrays.

WO2021/160890 ("WO'890") proposes a fire extinguishing system for a roof with solar panels, where a pipe system equipped with open nozzles is connected to a fluid supply and is configured to deliver an extinguishing fluid to a roof area with rows of solar panels which typically are installed in an angled manner. The open nozzles are arranged on linear pipe segments in the direction of the solar panel rows and are oriented perpendicular to the pipe segments in an alternating manner such that one set of nozzles, e.g. every second nozzle on the pipe segment, discharges beneath one row of panels and the other set of nozzles discharges on top of another, adjacent row of panels and the space in-between these two rows. A fire is detected and located using a spatially resolving fire detection system, e.g. with a linear heat detector, which in turn controls discharge of the extinguishing fluid by activating a remote-controllable valve upstream of the fluid supply.

Rooftop solar panel installations with a fire protection system have a coverage area which is defined as the surface area of the roof which includes the group of solar panels of the solar panel installation and the respective space between these solar panels, wherein both, the panels and the space between, are protected against fire hazards by the fire protection system, with the coverage area being confined to the outer boundary of the group of the respective solar panels.

The coverage area is limited by (a) the pressure of the supplied fluid at the altitude of the roof, (b) the number of nozzles that can discharge the extinguishing fluid at a given minimum nozzle pressure, (c) arrangement of these nozzles and (d) the individual protection area and overlap of the nozzles. WO'890 proposes using nozzles of the type "Viking Model C-1 Window Sprinkler" which are known to have a metric K-factor between 21 and 84. In practice, the system passed fire tests using "Viking Model C-1 Window Sprinkler" nozzles that have a metric K-factor of 30, 62 and 84 and an average protection area per nozzle of 1-2 $m^2$, typically about 1.5 $m^2$ at a minimum nozzle pressure of 1 bar.

The "Viking Model C-1 Window Sprinkler" nozzle proposed in WO'890 is an open water spray nozzle that has a hollow nozzle body with a nozzle inlet at a proximal end, a fluid passage arranged within the nozzle body, and a nozzle head at a distal end with an orifice for discharging the firefighting fluid. Generally, the C-1 nozzle comes in two different configurations, one for medium K-factors between 21 and 62, and one for large K-factors above. The fluid passage includes a right circular cylindrical chamber with a width between 12.7 and 14.3 mm, and a length of 31 mm for medium K-factors or 33.3 mm for large K-factors. The cylindrical chamber is arranged centrally within the nozzle body, extends between the nozzle inlet and the orifice, and can conduct fluid in a direction along its cylinder axis towards an outlet chamber surrounded by the nozzle head.

The right circular cylindrical nozzle head includes a base segment, a deflector mount and a deflector member, and a diameter of 25.4 mm for medium, or 31.75 mm for large K-factors. The base segment of the nozzle head encloses the centrally positioned orifice which directly connects the cylindrical chamber with the outlet chamber. The deflector is mounted to the base segment on one side of the nozzle head via the deflector mount being made of a single, solid arm-like element, and such that a face of the deflector is positioned opposite to the orifice. The deflector mount is of truncated right circular cylindrical shape with the intersecting plane being radially offset from the cylinder axis, having a deflector mount distance to the center of the orifice of 3.7 to 6.7 mm, increasing with rising K-factors, and a depth of the deflector mount between 6.6 and 9.3 mm.

The outlet chamber has a right circular cylinder section shape being defined by the base segment as the first base of the cylinder, the deflector as the second base, a length of the outlet volume of 6.35 mm for medium K-factors and 9.53 mm for large K-factors, and the inwards facing side of the deflector mount as the intersecting plane which is perpendicular to both the first and the second base. The outlet chamber is open on all other sides, providing a nozzle outlet perpendicular to the cylinder axis.

The orifice for medium K-factors is a two-segment opening with a total length of 3.175 mm, positioned centrally in the base segment and symmetrically about the cylinder axis. The first segment is of frustoconical shape fluidly connected to the cylindrical chamber with an orifice inlet diameter of 14.3 mm for all medium K-factors and an orifice inlet length of 2.2 to 0.8 mm, decreasing with rising K-factors. The frustoconical segment becomes more narrow with an angle 30°, down to a second diameter of 6.9 to 11.5 mm, increasing with rising K-factors. A right circular cylindrical segment extends from the frustoconical segment with the second diameter as the orifice outlet diameter and an orifice outlet length of 1 to 2.4 mm, increasing with rising K-factors.

The orifice for large K-factors is a direct continuation of the circular chamber, extending through the base segment with the same diameter.

The known "Viking Model C-1 Window Sprinkler" nozzle consequently has operating ratios impacting the spray pattern and discharge performance of orifice outlet diameterto-outlet volume length between 1.08 to 1.51, and orifice outlet diameter-to-deflector mount distance between 1.83 and 2.15.

When fluid is provided to the nozzle inlet at an operating pressure, it passes through the cylindrical chamber, is sprayed through the orifice into the outlet volume, where a large portion of the fluid impacts the deflector and the inner side of the mount segment. The fluid is deflected, parts of it multiple times, and redirected towards the open sides of the outlet volume, leaving the confined space of the water spray nozzle in a characteristic manner. The water spray nozzles have a horizontal discharge angle of about 180° for at least 90% of the discharged fluid.

The proposed system of WO'890 is known to cover a typical solar panel system of up to 128 m$^2$ in practice, requiring approx. 80 nozzles, and have a non-uniformity of 20%, i.e. on average each nozzle would have a nozzle pressure of the minimum nozzle pressure plus 20%. Such a non-uniformity compensation is considered so that even the most remote nozzle will have the minimum nozzle pressure, due to real pressure loss along the pipe segments. Using the proposed nozzles with a metric K-factor of 80 leads to a total fluid discharge Q of Q=80*84*1.2 L/min=8,064 m$^3$/min, resulting in a normalized fluid application rate of 63 mm/m$^2$/min, i.e. the total fluid discharge of 8,064 m$^3$/min normalized over the coverage area of 128 m$^2$ (8,064 m$^3$/min/128 m$^2$=63 mm/m$^2$/min). Such a system covering about 128 m$^2$ would require a main supply pipe with a DN125 diameter for a fluid flow of about 10 m/s, and a single pump with a typical output of 8 m$^3$/min.

In practice, individual solar panel installations preferably cover a much larger area. For example, various European building codes suggest a maximum unobstructed rooftop area of up to 1600 m$^2$, or 40×40 m$^2$. The known system of WO'890 scaled to such a coverage area would require approx. 1.000 nozzles with a total fluid discharge of Q=100.8 m$^3$/min and appropriate main supply pipes of 2×DN300 diameter for a fluid flow of about 10 m/s, and appropriate fluid supply having e.g. 12 to 13 pumps with 8 m$^3$/min output each, to supply the whole fire protection system at once. Using the smallest proposed nozzles of the known system with a metric K-factor of 30, leads to a fluid discharge of Q=36 m$^3$/min and requires about 5 pumps and 2×DN200 or 1×DN300 main supply pipes, for a normalized fluid application rate of 22.5 mm/m$^2$/min.

In practice, such large systems are impractical and commercially unattractive, and therefor need to be divided into multiple individually activated fire extinguishing subsystems to reduce the load, e.g. pump count and pipe sizes. Such fire protection concepts with multiple fire extinguishing subsystems are then designed so that not all but fewer, e.g. only adjacent, subsystems need to be supplied at once. The system as described in the paragraph above with the larger nozzles would be divided into 12 smaller subsystems, with a minimum of 3 subsystems being supplied at once. This reduces main supply pipe diameters to 1×DN250 or 2×DN150 and pump count to 3 pumps with 8 m$^3$/min output.

For such subdivided systems, WO'890 recognized the risk of strong winds, especially channeled along the rows of solar panels, that distort heat or flame propagation which may lead to a mislocation of the fire hazard, i.e. identification of the fire by a fire detection system in a wrong location, by several meters. Typically, when a fire starts at a border of the coverage area of a first fire extinguishing system, and strong winds distort propagation of the heat by carrying the hot air a few meters along the solar panel rows into the coverage area of a second fire extinguishing system adjacent to the first, the fire might be mislocated by the fire detection systems. This leads to activation of the second fire extinguishing system, unable to reach the true location of the fire and therefor to suppress or extinguish the fire. The fire will grow further until the detection thresholds within the first fire extinguishing system are exceeded, leading to a significantly delayed activation of that first fire extinguishing system. WO'890 proposes to solve the risk of mislocating a fire between two adjacent fire extinguishing systems by either (i) overlapping the coverage area of these two systems by a certain distance such that a fire mislocated by up to that distance will still be reached and suppressed by the more distant fire extinguishing system, albeit being located deeper within the coverage area of the other fire extinguishing system which likely will be left dormant, or (ii) overlapping the detection area by creating a border zone around the border between both fire extinguishing systems, to activate both systems at the same time when a fire is detected within that border zone. The system proposed in WO'890 therefore has a high complexity with multiple remote-controlled valve units for a single typical solar panel array.

A more extensive background to the technical area of fire protection systems for rooftop solar panel installations invention is provided in the White Paper "Photovoltaic systems on industrial and commercial buildings" (originally "Photovoltaikanlagen auf Industrie-und Gewerbebauten") by Zurich Resilience Solutions.

It is believed that there is a desire to provide a fire protection system for a roof with solar panels reduced complexity, a reduced water demand, or a greater coverage area per system.

DISCLOSURE OF THE INVENTION

Preferred embodiments of rooftop solar panel installations, fire protection systems for rooftop solar panel installations, methods and water spray nozzles therefor provide for effective fire protection with a normalized fluid application rate of less than 15 mm/m$^2$/min over the coverage area.

A preferred embodiment provides a fire protection system for rooftop solar panel installations that comprises a group of water spray nozzles with a metric K-factor of 20 or less and with a distribution area of 1-3 m$^2$ per nozzle, to discharge firefighting fluid to a coverage area of at least 500 m$^2$, the coverage area being an area of a roof with a group of solar panels protected by the group of water spray nozzles; a fluid pipe system to connect the group of water spray nozzles to a fluid supply and to provide the firefighting fluid to the group of water spray nozzles; a fire hazard detection system with at least one fire hazard detector configured to detect a fire hazard on the roof and at least one detection control unit to generate an alarm signal upon detection of a fire hazard; a valve unit to allow passage of the firefighting fluid from the fluid supply to the group of water spray nozzles in response to the alarm signal; with the group of water spray nozzles being configured to discharge the firefighting fluid received from the fluid supply with a normalized fluid application rate of less than 15 mm/m$^2$/min.

The preferred fire protection system for rooftop solar panel installations, methods and water spray nozzles therefor provides for fire protection of rooftop solar panel installations with normalized fluid application rates smaller than previously known.

It is understood that the coverage area is a property of the group of water spray nozzles and is defined as the surface area of the roof which includes all of the solar panels of the solar panel installation, and the respective space between these solar panels, that are both, panels and space between, protected against fire hazards by the group of water spray nozzles of the fire protection system, with the coverage area being confined to the outer boundary of the group of the respective solar panels.

A solar panel that is not protected by the group of water spray nozzles does not contribute to, but may be located within, the coverage area of the group of water spray nozzles. On the other hand, a solar panel that is protected by the group of water spray nozzles needs to be included in the coverage area.

A preferred coverage area is cohesive, which is defined in the context of the present application by consisting of a single area, in other words not consisting of multiple non-adjacent areas.

As an example, the coverage area for a group of identical rectangular solar panels, with appropriate water spray nozzle coverage, arranged back-to-back in rows of even length, even width and identical orientation, with starting points along a common line, would have the shape of a quadrilateral. If the common line is perpendicular to the orientation of the rows, the coverage area would have a rectangular shape with its corners being at the outmost corner points of the solar panels.

With a normalized fluid application rate of less than 15 mm/m$^2$/min, the inventive fire protection systems are capable of providing fire protection to coverage areas of 500 m$^2$ or more, preferably of 1000 m$^2$ or more, more preferably of up to 1600 m$^2$. The embodiments of fire protection systems for rooftop solar panel installations of the present invention are capable of providing fire protection to larger coverage areas as previously known in the art.

The firefighting fluid is water-based. Water-based firefighting fluids mainly comprise water, but can also comprise additives to the water, like anti-freeze additives to prevent or delay freezing of stored fluid at lower temperatures, foam additives to increase volume, stickiness and fire extinguishing or suppression performance of the fluid, or other additives related or unrelated to performance of the fire protection system. A preferred firefighting fluid comprises water without foam additives.

A preferred roof for rooftop solar panel installations with a fire protection system of this invention is a roof with a slope of 15° or less, more preferably with a slope of 10° or less. Preferably, the roof is a gable roof or a flat roof. Roofs with such a low slope allow for easy installation and maintenance of both the solar panel installation and the fire protection system. Such a low slope further keeps the firefighting fluid on the roof for a prolonged time, and increases accumulation of the fluid on the roof. This leads to a more effective and fluid saving extinguishing action in case of a fire.

The rooftop solar panels are preferably arranged in rows, and more preferably are of a uniform dimension, orientation, elevation and/or tilt. Uniform type and arrangement of solar panels is advantageous for fire protection purposes as it provides a uniform fire hazard distribution and allows for a uniform fire protection system which is less complicated to design and install.

Preferably, the solar panels of a given roof segment have a minimum distance towards the edges of the roof segment, wherein the edges of the roof segment are defined by the outer boundaries of the roof segment towards the ground or towards other adjacent roof segments of significantly different elevation. The edges of the roof segment can comprise a parapet wall. The solar panels can have a general first minimum distance towards the edges of the roof segment, preferably of 1 meter, more preferably of 1.2 meter. The solar panels further can have a second minimum distance towards the edges of the roof segment when another, directly adjacent roof segment has a greater elevation than the roof segment which comprises the solar panels in question, the second minimum distance preferably is 5 meters.

A preferred fire hazard detection system comprises at least one linear heat detector, the at least one linear heat detector being arranged to detect temperature, preferably absolute and rate of increase, within the coverage area. A preferred linear heat detector is configured to have a spatial resolution to determine a location or area of a fire hazard, more preferably with a spatial resolution of less than 2 meters, most preferably of 1 meter or less. Such a preferred linear heat detector can have a spatial resolution by having individual detection units at certain positions of the linear heat detector to determine quantity of a fire hazard parameter at the specific detection units. Alternatively, it can determine quantity of a fire hazard parameter continuously along the linear heat detector and have the capability to deduct location of a fire from a location parameter connected to the continuous fire hazard parameter readout.

An alternative fire hazard detection system comprises at least one radiation fire detector, preferably an infrared fire detector, to detect a fire hazard within the coverage area. A preferred infrared fire detector is configured to have a spatial resolution, preferably by comprising an infrared-sensitive 2D-array to determine location of a fire hazard within the coverage area.

A preferred embodiment of the fire hazard detection system comprises a detection control unit in signal connection with fire detectors of the fire hazard detection system. Preferably the fire detectors transmit the readout of a fire hazard parameter to the detection control unit. This readout can comprise quantitative values of the fire hazard parameter, e.g. a temperature readout of a heat detector, or qualitative values of the fire hazard parameter, e.g. exceedance of a radiation intensity threshold stored within a radiation detector. The detection control unit responds to receiving the readout by generating an alarm signal if internal alarm criteria are fulfilled by the received readout. For heat detectors, these internal alarm criteria can comprise a minimum temperature threshold and/or a minimum rate of temperature rise threshold. The detection control unit can be configured to generate an alarm signal if some or all of these criteria are fulfilled. A detection control unit can be spatially detached from connected fire detectors or can be in the vicinity, even within the same housing as a fire detector. Each fire detector can have an own detection control unit, or multiple, or all, detectors of the fire hazard detection system can be connected to a single detection control unit.

The valve unit is configured to control passage of the firefighting fluid from the fluid supply to the group of water spray nozzles. The valve unit can comprise any wet alarm valve, dry alarm valve, pre-action dry alarm valve, deluge valve, or any other fluid valve known in the field. The valve unit is especially configured to allow passage of the firefighting fluid in response to the alarm signal generated by the fire hazard detection system. Preferably, the valve unit is controlled by a valve control unit which is in signal connection with the detection control unit and the valve unit, receives an alarm signal and generates an activation signal in response to receiving the alarm signal. The activation signal is then transmitted to the valve unit to allow passage of the firefighting fluid.

Preferably the valve unit is further configured to close the passage of the firefighting fluid in response to a manual activation of a closing mechanism, or alternatively in response to a closing signal. The closing signal can be generated in response to the detection control unit not detecting a fire hazard within the coverage area anymore. Alternatively, the closing signal can be generated by an operator, e.g. the fire brigade, preferably from a remote control unit in signal connection with the valve unit. The closing signal can be altered, manipulated, withheld or forced by a detection control unit and/or a valve control unit.

In a preferred embodiment, the fluid supply provides pressured water with at least a predetermined minimum fluid supply pressure. The fluid supply preferably comprises a fluid pump. In an alternative embodiment, the fluid supply can comprise a pressurized fluid tank, preferably being pressurized by a compressor or by pressurized gas bottles, preferably containing inert gas.

Preferred water spray nozzles of the fire protection system are open nozzles. Open nozzles are understood as nozzles that do not comprise a controllably movable blocking member to prevent discharge of a firefighting fluid, or a temperature dependent triggering mechanism like a sprinkler glass bulb. A fire protection system with open nozzles typically has a controllable valve unit to control fluid passage to the nozzles, is known to be less susceptible to frost damage due to the pipes being mostly non-water-filled. In some embodiments, the sections of the pipe system that are fluid-filled in the non-activated state of the fire protection system can be shielded from outside temperature, preferably by positioning these sections within a building or any other insulated structure, e.g. a container.

A preferred water spray nozzle comprises a hollow nozzle body with a nozzle inlet at a proximal end, a fluid passage arranged within the nozzle body, and a nozzle head at a distal end with an orifice for discharging the firefighting fluid, wherein the fluid passage extends, and provides a fluid connection, between the nozzle inlet and the orifice, defining a fluid direction.

The fluid passage comprises a first chamber within the nozzle body, the first chamber being in direct fluid connection with the orifice of the nozzle head. A preferred first chamber is of cylindrical shape, preferably right circular cylindrical, with its cylinder axis aligned in fluid direction, and the orifice is preferably centered at the distal face of the cylindrical first chamber. Preferably, the cylindrical first chamber has a width of 10 to 20 mm, more preferably 12 to 16 mm, most preferably 13 to 15 mm, and a length of 5 to 20 mm, more preferably of 5 to 15 mm and most preferably between 8 and 10 mm.

In a preferred embodiment, the fluid passage further comprises a proximal prechamber arranged between the fluid inlet and the first chamber. The prechamber has a greater cross-sectional area than the first chamber, and is preferably centered around the proximal face of the first chamber. More preferably the prechamber has a cylindrical shape, even more preferably the same shape as the first chamber, most preferably being right circular cylindrical. Preferably, the cylindrical prechamber has a width greater than the width of the cylindrical first chamber, more preferably of more than 20 mm, and a length greater than the length of the cylindrical first chamber, more preferably of more than 20 mm.

A prechamber of this embodiment defines the size of the nozzle opening at the nozzle inlet and can provide means for housing, attaching or fixating a strainer, preferably an internal circumventing groove to accommodate a gasket or a snap ring for fixating the strainer to prevent particles or debris from within the pipes to clog the orifice.

A preferred nozzle head comprises a base segment enclosing the orifice, a deflector mount extending from the base segment and a deflector member formed at the distal end of the deflector mount.

The preferred base segment has the shape of a cylinder, preferably right circular cylindrical, and preferably a diameter of 20 to 30 mm, more preferably of 23 to 26 mm, most preferably of 24 to 25 mm.

The orifice is an opening within the base segment connecting the first chamber with a distal exterior of the nozzle. The orifice defines a discharge axis for fluid exiting from first chamber towards the outside, and has a smaller cross-sectional area than the first chamber. A preferred orifice has a distal outlet width of 6.5 mm or smaller, more preferably smaller than 6 mm, even more preferably smaller than 5 mm, and most preferably between 3 and 4.6 mm.

A more preferred orifice is centrally disposed in the planar proximal face of the base segment towards the first chamber and comprises a frustoconical segment with an orifice inlet length, or depth, having a narrowing diameter from an orifice inlet width down to a smaller orifice outlet width, and further comprises a right circular cylindrical segment with an orifice outlet length and orifice outlet width, extending directly from the frustoconical segment such that both segments are aligned along the same central axis. Both segments together form the single orifice, with a segmented shape to assist in shaping the flow of the fluid from the first chamber towards the outside. The narrowing diameter of the frustoconical segment defines an angle between the outer surface of said segment and the planar proximal face of the base segment. Preferably, the angle is between 4° and 50°, more preferably 45°. In a preferred embodiment, the orifice has a total orifice length of less than 2.5 mm, more preferred of 2 mm. It preferably comprises an orifice inlet length-to-orifice outlet length-ratio of 0.9 to 1.1, more preferably of 1, most preferably with an orifice inlet length and an orifice outlet length of 1 mm each.

The orifice inlet width and orifice outlet width significantly impact the fluid discharge characteristics of the nozzle, and therefore the K-factor. In a preferred embodiment, the orifice outlet width is Preferably, the orifice inlet width is 1 mm larger than the orifice outlet with, which leads to embodiments with a metric K-factor of 4 for an orifice outlet width of 3 mm, a metric K-factor of 6 for an orifice outlet width of 3.7 mm, a metric K-factor of 10 for an orifice outlet width of 4.6 mm and a metric K-factor of 17 for an orifice outlet width of 6 mm.

The deflector mount supports the deflector member and restricts discharge of the firefighting fluid such that the firefighting fluid is not discharged through, but instead impacts on and reflects off it. The deflector mount has a minimum lateral deflector mount distance from the center of the orifice, preferably between 4 and 8 mm, more preferred between 5 and 7 mm, most preferred about 6 mm.

A preferred deflector mount consists of a single solid arm extending from a part of the distal face of the base segment. Preferably, the single solid arm of the deflector mount has the shape of the smaller cylindrical segment formed by a cylinder truncated by an intersecting plane, wherein the intersecting plane is a plane passing through the central axis of the cylinder and further offset radially by the deflector mount distance. The resulting truncated cylindrical deflector mount has a width of preferably 12 to 29 mm, more preferably of 18 to 24 mm, most preferably of 21 to 22 mm, and a depth, or thickness, of preferably 2 to 11 mm, more preferably of 4.5 to 8 mm, most preferably of 6.3 mm.

In a specific, preferred embodiment, the right circular cylindrical base segment has a diameter of 24.6 mm, the deflector mount has a deflector mount distance of 6 mm, resulting in a deflector mount depth of 6.3 mm and deflector mount width of 21,475 mm.

The deflector member extends on the distal end of the nozzle from the deflector mount to provide a solid interface for the majority of the fluid discharged through the orifice to impact and be reflected on. A preferred deflector member has a proximal surface that is parallel to the distal surface of the base segment, more preferably the deflector member has a cylindrical shape centrally arranged about the discharge axis of the orifice. Most preferably, the deflector member and the base segment have the same right circular cylindrical shape with the same dimensions.

A preferred configuration of the nozzle head surrounds a second chamber, which is an open volume restricted at its proximal face by the base segment, at its distal face by the deflector member, and preferably at one side by the deflector mount. The sides not covered by the deflector mount are open and define the fluid discharge pattern and the fluid discharge direction, perpendicular to the fluid direction within the nozzle body. The nozzle with such a nozzle head configuration has a discharge angle of less than 360°, more preferably a discharge angle of less than 270°, most preferably of 170°-190°. Typically, said discharge angle is determined by the radial discharge profile comprising at least 90% of the discharged fluid, more preferably at least 95%.

The length of the second chamber, i.e. the open distance between the base segment and the deflector member, significantly impacts fluid distribution characteristics of the nozzle, like spray pattern, fluid application range, average protection area per nozzle. A preferred second chamber has a cylindrical shape, preferably right circular cylindrical minus the deflector mount, and a length of 7 to 11 mm, more preferred 8 to 10 mm, most preferred 9 mm.

Preferred ratios of operating dimensions of the inventive water spray nozzles provide for a desired and preferred discharge rate and discharge pattern. A preferred outlet width-to-second chamber length-ratio of the inventive water spray nozzles is between 0.27 and 0.93, preferably between 0.33 and 0.73, more preferably between 0.33 and 0.52. A preferred outlet width-to-deflector mount distance-ratio is between 0.375 and 1.625, preferably between 0.5 and 1.09, more preferably between 0.5 and 0.77.

Applicant discovered that using a water spray nozzle according to the invention with a combination of preferred orifice outlet width, preferred second chamber length and preferred deflector mount distance, preferably with preferred operating dimension ratios, provides for effective fire protection for rooftop solar panel installations with a reduced fluid discharge rate per area compared to known protection system for rooftop solar panel installation. Such preferred combinations of nozzle parameters provide for a range of water spray nozzles metric K-factors between 4 and 20, and such water spray nozzles have a distribution area of 1-3 $m^2$, preferably about 1.6 $m^2$, per nozzle. The distribution area is to be understood such that a single nozzle is capable of providing sufficient fire protection to that distribution area, preferably it is the minimum area that comprises at least 90% of the total fluid discharge of a nozzle.

A water spray nozzle with a preferred combination of nozzle parameters can have a metric K-factor of 20 and a distribution area of 1.6 $m^2$ at a minimum nozzle pressure of 1 bar. Using such a water spray nozzle in a fire protection system for rooftop solar panel installations, with about 1000 nozzles for a coverage area of 1600 $m^2$ and a non-uniformity compensation of 20%, provides for a normalized fluid application rate of 15 $mm/m^2/min$ or less.

Alternatively, a water spray nozzle with a preferred combination of nozzle parameters can have a metric K-factor of 17 and a distribution area of 1.6 $m^2$ at a minimum nozzle pressure of 1 bar. Using such a water spray nozzle in the same fire protection system for rooftop solar panel installations provides for a normalized fluid application rate of 12.75 $mm/m^2/min$ or less.

Further, using water spray nozzles with a preferred combination of nozzle parameters provides for a metric K-factor of 10, 7 or 4 in such fire protection systems provides for effective and sufficient protection with a normalized fluid application rate of 7.5 $mm/m^2/min$ or less, 5.25 $mm/m^2/min$ or less, or 3 $mm/m^2/min$ or less, respectively.

It is known to the skilled person that decreasing K-factors typically also reduces the average distribution area per nozzle. To maintain a suitable distribution area of about 1.6 $m^2$, it can therefore be beneficial to increase the minimum nozzle pressure, preferably to 1.25 bar, which increases water discharge by about 12% and distribution area of the inventive water spray nozzles by on average 50%. For water spray nozzles with a metric K-factor of 4 or 7, it can be beneficial to increase the minimum nozzle pressure to 1.5 bar or even 2 bar, which increases water discharge by about 22% or 41% respectively, and distribution area of the inventive water spray nozzles by on average 100% or 150%, respectively.

Applicant discovered that using a water spray nozzle according to the invention in a fire protection system for a rooftop solar panel installation provides for fire protection of a coverage area of 500 $m^2$ or more, preferably of 1000 $m^2$ or more, more preferably of up to 1600 $m^2$.

A preferred embodiment of rooftop solar panel installations comprises multiple solar panel installations on adjacent segments of a roof. Each of the multiple solar panel installations has a fire hazard detection system and a fire suppression system according to the invention. Individual coverage areas of the multiple solar panel installations do not spatially overlap. The fire hazard detection system comprises fire detectors and a detection control unit, and the fire suppression system comprises a group of water spray nozzles and a fluid pipe system, preferably including a group of branch pipes connecting to the group of water spray nozzles and a main pipe with a valve unit to control and provide firefighting fluid, preferably water, from a fluid supply to the branch pipes, with control of the valve unit being exerted by a valve control unit in response to an alarm signal generated by the detection control unit after the fire detectors detect a fire hazard within or about the coverage area.

Each solar panel installation has a separate valve unit to selectively control fluid passage to the group of water spray nozzles specifically of that solar panel installation.

In a preferred embodiment, multiple solar panel installations share a fluid supply, preferably also a valve control unit. Preferably, the fluid supply is designed to be able to provide firefighting fluid to at least two fire suppression systems at the same time with a minimum nozzle pressure to each water spray nozzle of the least two fire suppression systems. The fluid supply can comprise multiple fluid pumps that are selectively activated on demand to provide the minimum nozzle pressure, in dependence of the number of fire suppression systems that are to be provided with the firefighting fluid at the same time.

Preferably, multiple fire hazard detection systems share a detection control unit. Alternatively, each of the fire hazard detection systems has its own detection control unit.

In an alternative embodiment, multiple fire hazard detection systems share a spatially resolving fire hazard detector, or a group of spatially resolving fire hazard detectors, with a predetermined area allocation towards individual solar panel installations. A fire hazard detected by said spatially resolving fire hazard detector, or group thereof, is then attributed to one solar panel installation and/or to a border area of adjacent solar panel installations.

In a more preferred embodiment of rooftop solar panel installations with multiple solar panel installations on adjacent segments of a roof, at least two of the coverage areas are separated from each other by a fire wall constructed to prevent or slow down proliferation or spread of a fire hazard from one coverage area to another. Preferably, the fire wall is constructed with fire retarding material and has a minimum distance between a solar panel of the solar panel installations and the fire wall. The minimum distance can depend on the height difference of the fire wall and the roof surface, or of the fire wall and the upper edge of the solar panel. In a preferred embodiment, said minimum distance is 1 meter, more preferably 1.2 meter. In a more preferred embodiment, the minimum distance is 1.2 meter when the upper edge of the fire wall is 0.5 meter above the upper edge of the solar panel, and more than 1.2 meter, preferably 2 meter, more preferably 2.5 meter when the upper edge of the fire wall is less than 0.5 meter above the upper edge of the solar panel.

DESCRIPTION OF THE DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples as provided by the appended claims.

DETAILED DESCRIPTION OF THE INVENTION

Figure 1:
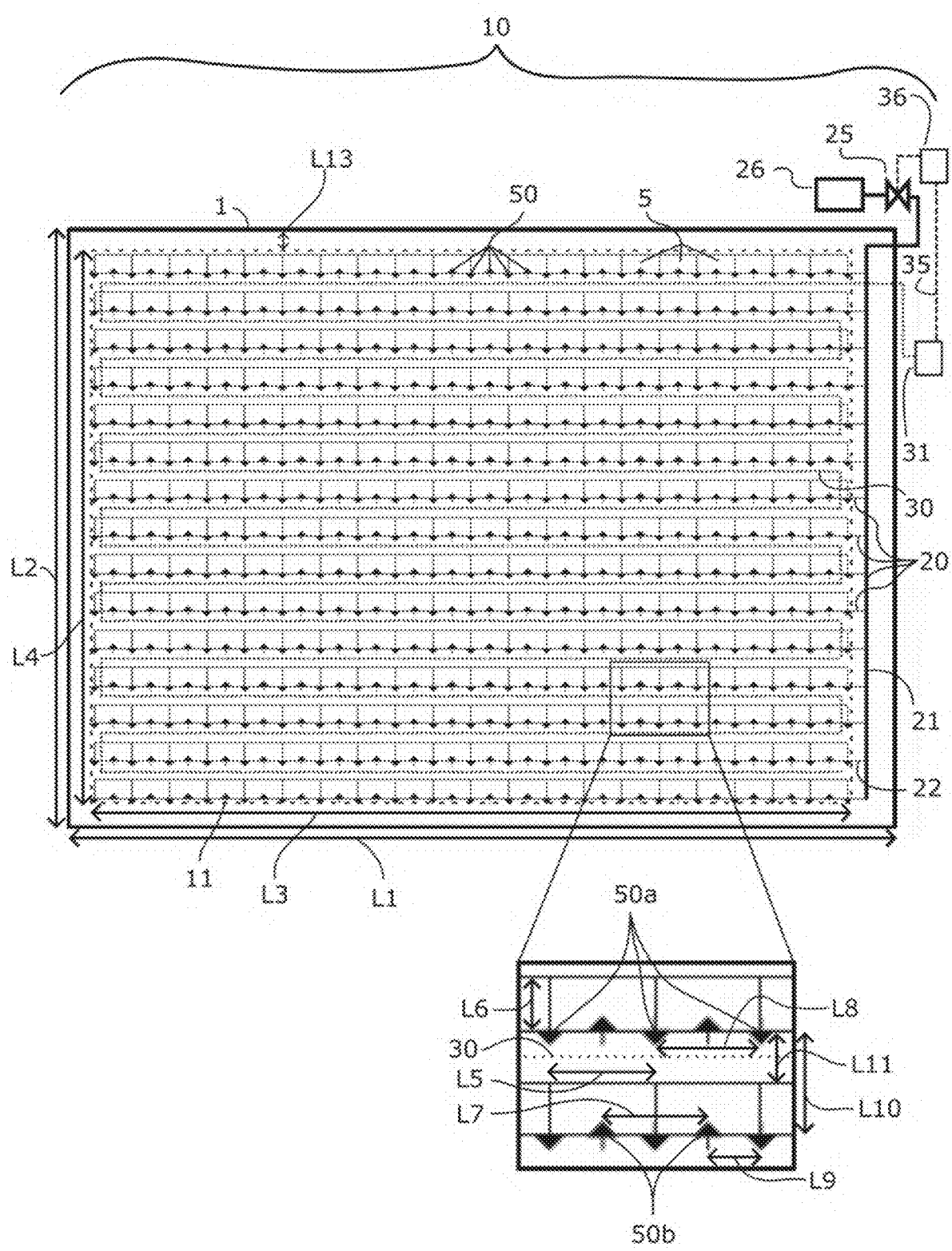
FIG. 1 is a schematic plan view of a preferred embodiment of a rooftop solar panel installation with a fire protection system.

FIG. 1 shows a rooftop solar panel installation with a fire protection system according to a preferred embodiment of the invention. The fire protection system 10 comprises a fire suppression system and a fire hazard detection system.

The roof 1 has a first dimension L1 and a second dimension L2, defining the maximum dimensions of the rooftop solar panel installation. Solar panels 5 of the rooftop solar panel installation can be mounted at an angle towards the surface of the roof 1 and can be oriented towards the course of the sun to increase or maximize power gain per solar panel 5. The solar panels 5 in this embodiment each have identical first panel dimensions L5 and second panel dimensions L6, and are of rectangular surface shape. The solar panels 5 are arrayed regularly in multiple rows of solar panels 5 over the area of the roof 1. The rows of solar panels 5 on the roof 1 define a coverage area 11 with a first coverage area length L3 and a second coverage area L4.

The fire suppression system has water spray nozzles 50 arranged on branch pipes 22 of a fluid pipe system 20. A main pipe 21 provides water from a fluid supply 26, which is regulated by a valve unit 25, to the water spray nozzles 50 through the branch pipes 22. The valve unit 25 is configured to prevent or allow water passage from the fluid supply 26 to the main pipe 21.

Per row of solar panels 5, one branch pipe 22 is arranged on one side of the row of solar panels 5, defining a group of rows of branch pipes 22 each with a number of water spray nozzles 50. The water spray nozzles 50 discharge water in an area of the roof 1 that encloses the coverage area 11.

Along one row of panels 5, the panels 5 are arranged with no or only a minimal gap to maximize potential solar power gain. Adjacent rows of solar panels 5 are spaced apart by a panel row clearance L11, and adjacent rows of branch pipes 22 are spaced apart with a branch pipe spacing L10. In this embodiment, with even arrangement of the rows of solar panels 5 and the rows of branch pipes 22, the branch pipe spacing L10 is defined by the sum of the panel row clearance L11 and the second panel dimension L6.

The water spray nozzles 50 are divided into nozzles with a first orientation 50a and nozzles with a second orientation 50b, with the first orientation and the second orientation being in opposed directions, that is with an angle of 180° within the plane of the surface of the roof 1. In this embodiment, the water spray nozzles 50 are arranged on a branch pipe 22 with the first orientation and the second orientation in an alternating manner, that is each nozzle 50 with one orientation is followed in the direction of the branch pipe 22 that they are installed on by a nozzle 50 with the other orientation. In this embodiment, the first nozzle 50, and every second nozzle after that, on each branch pipe 22 is of the nozzles with the first orientation 50a, and the second nozzle 50, and every second nozzle after that, on each branch pipe 22 is of the nozzles with the second orientation 50b.

Water spray nozzles with the first orientation 50a are arranged with a first nozzle group spacing L7 along a branch pipe 22, and the nozzles with the second orientation 50b are arranged with a second nozzle group spacing L8, accordingly. Each nozzle 50 is spaced apart from the nearest next nozzle 50 along a branch pipe 22 by a nozzle spacing L9. In this embodiment first panel dimension L5 and first and second nozzle group spacing L7 and L8 are of identical length, and nozzle spacing L9 is half of that length with the nozzles being evenly distributed along the branch pipe 22.

The fire hazard detection system has fire hazard detectors 30 and a detection control unit 31. The fire hazard detectors 30 are arranged across the coverage area 11 to detect and spatially resolve fire hazards within that coverage area 11, and are in signal connection with the detection control unit 31, which is, in this embodiment, positioned remotely from the fire hazard detectors 30. The detection control unit creates an alarm signal in response to a fire hazard detected by the fire hazard detectors 30. That alarm signal is transmitted through the alarm line 35 to a valve control unit 36, which controls fluid passage through the valve unit 25. The valve control unit 36 then opens or unblocks the valve unit 25, depending on the type of the valve, after receiving an alarm signal from the detection control unit 31.

In the shown embodiment, the fire hazard detectors 30 are in the form of a single linear heat detector cable, major portions of the linear heat detector cable are installed parallel to branch pipes 22, with smaller segments of the detector cable being installed perpendicular to the branch pipes 22 to cross to another parallel portion. These parallel portions of the detector cable are shown to be located in a clearance between panel rows, which is not the most preferred embodiment but shown as such for visibility. More preferable would be placement of the detector cable about the branch pipe 22, most preferably elevated above the nozzles 50 to prevent water discharge during an extinguishing action to manipulate the heat readout.

Figure 2:
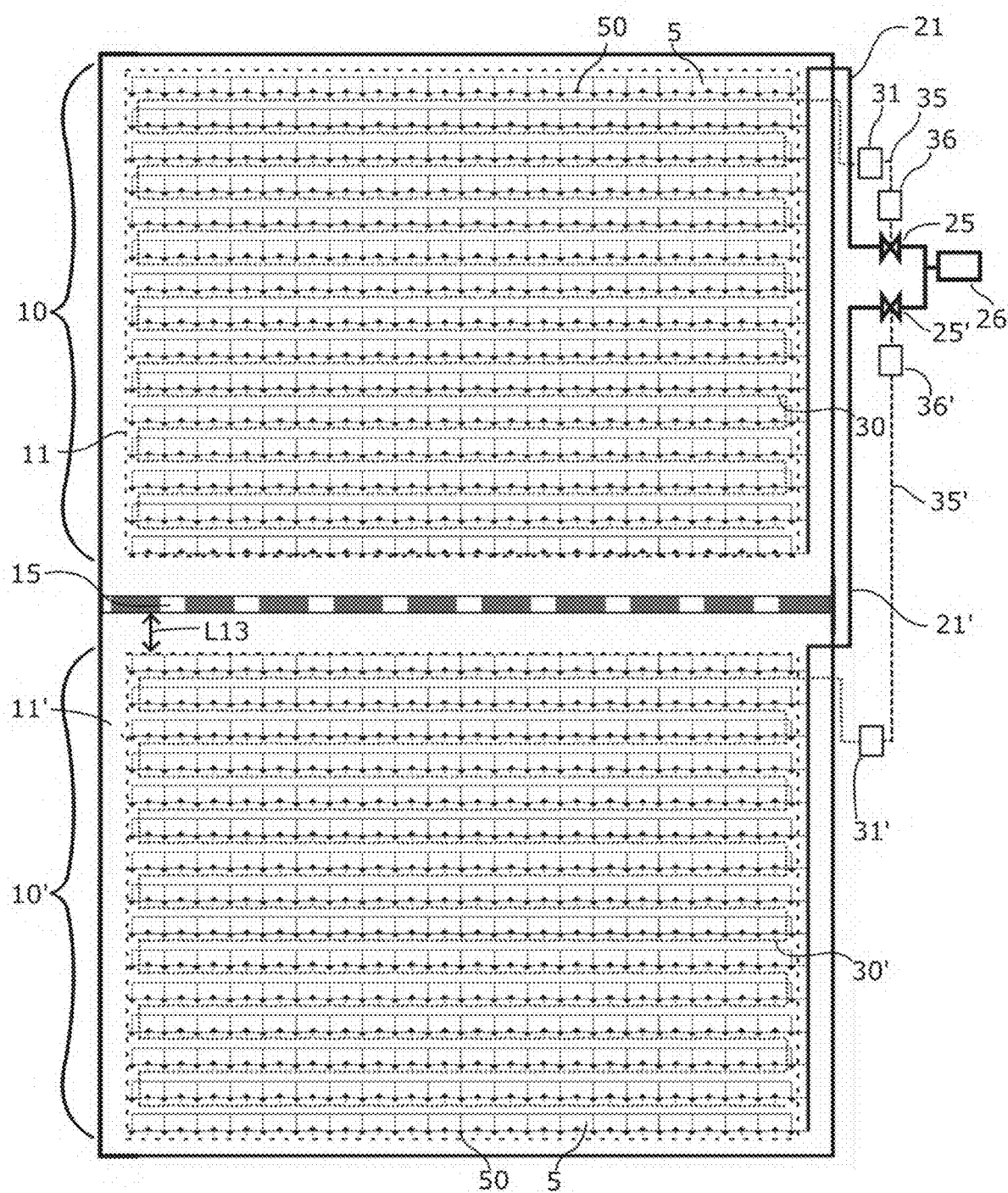
FIG. 2 is a schematic plan view of a preferred embodiment of two adjacent rooftop solar panel installations of FIG. 1 with fire protection systems.

FIG. 2 shows another embodiment of the invention with two rooftop solar panel installations with fire protection systems. In this embodiment, two rooftop solar panel installations of FIG. 1, each with a fire protection system, are separated by a fire wall on the roof.

The fire wall 15 separates one area of the roof with a first solar panel installation and a first fire protection system 10 from another, adjacent area of the roof with a second solar panel installation and a second fire protection system 10'. Each fire protection system 10,10' provides an own coverage area 11,11' to their respective solar panel installation with solar panels 5.

The fire protection systems 10,10' each have a fire suppression system with individual and separate groups of water spray nozzles 50. Each group of nozzles 50 per fire suppression system is connected to a separate main pipe 21,21' via an independent group of branch pipes 22,22'. The separate main pipes 21,21' are each in fluid connection with separate valve units 25,25'. The valve units 25,25' are in fluid connection with the same fluid supply 26, and control fluid passage between the fluid supply 26 and the main pipes 21,21' and the branch pipes 22,22'.

Both fire protection systems 10,10' comprise a separate fire hazard detector 30,30' each connected to a separate detection control unit 31,31'. The control units 31,31' each have an alarm line 35,35' for transmitting fire protection system specific alarm signals to separate valve control units 36,36'. The valve control units 36,36' control the separate valve units 25,25' respectively.

The rooftop solar panel installations with fire protection systems 10,10' are spaced apart from the fire wall 15, with a minimum distance L13 between each solar panel 5 and the side of the fire wall 15 facing said solar panel 5.

Figure 3:
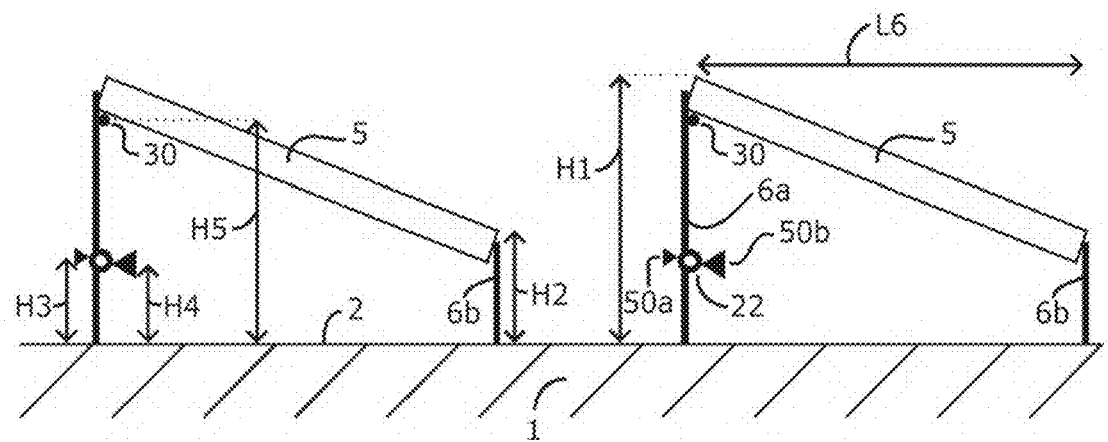
FIG. 3 is a schematic elevation view of a preferred embodiment of a rooftop solar panel installation with a fire protection system in direction of a row of solar panels.

FIG. 3 shows an elevation view of a preferred arrangement of solar panels as installed in solar panel installations of FIG. 1.

The elevation view of this figure is a sideview of two identical arrangements of two identical solar panels 5 of said solar panel installation, and is to be understood as the sideview of the preferred embodiment of the zoom-in section of FIG. 1, from the right side towards the left side of said section.

The solar panels 5 each are mounted on the roof surface 2 of the roof 1 via panel support structures 6a, 6b such that the mounted solar panel 5 has a first height of solar panel H1 over the roof surface 2 at a first edge of the solar panel 5 located at the panel support structure 6a, and a second height of solar panel H2 over the roof surface 2 at a second edge of the solar panel 5 located at the panel support structure 6b. In this embodiment, the first height H1 and the second height H2 are the maximum and minimum heights over the roof surface 2, respectively, of the upper edge of the solar panel 5. The panel support structures 6a, 6b of this embodiment each have a height smaller than the respective first and second heights H1, H2. In other embodiments not shown, the panel support structures 6a, 6b can be larger.

On each larger panel support structure 6a, a fire hazard detector 30 is arranged below the lower edge of the solar panel 5 at a height H5 over the roof surface 2. A branch pipe 22 is arranged on each larger panel support structure 6a, with water spray nozzles 50a,50b installed on said branch pipe 22 for providing firefighting fluid to the solar panels 5 and the roof surface 2.

The two branch pipes 22 are spaced apart by branch pipe spacing L10, and the two solar panels 5 are spaced apart by clearance L11.

The solar panels 5 are each installed with a module tilt a towards the roof surface 2 and have a second panel dimension L6 determined by the footprint, or projection, of the solar panel 5 on the roof surface 2.

The water spray nozzle 50a is installed at a height H3 with a first orientation, facing away from the solar panel 5 mounted on the panel support structure 6a to which said nozzle 50a is mounted via the specific branch pipe 22. The other water spray nozzle 50b is installed at a height H4 with a second orientation, facing towards the solar panel 5 mounted on the panel support structure 6a to which said nozzle 50b is mounted via the specific branch pipe 22.

The water spray nozzles 50a,50b of this embodiment of FIG. 2 are located at different depths along the branch pipe 22, depicted by the nozzle symbol of the nozzle 50a being smaller than the respective symbol of nozzle 50b.

Figure 4:
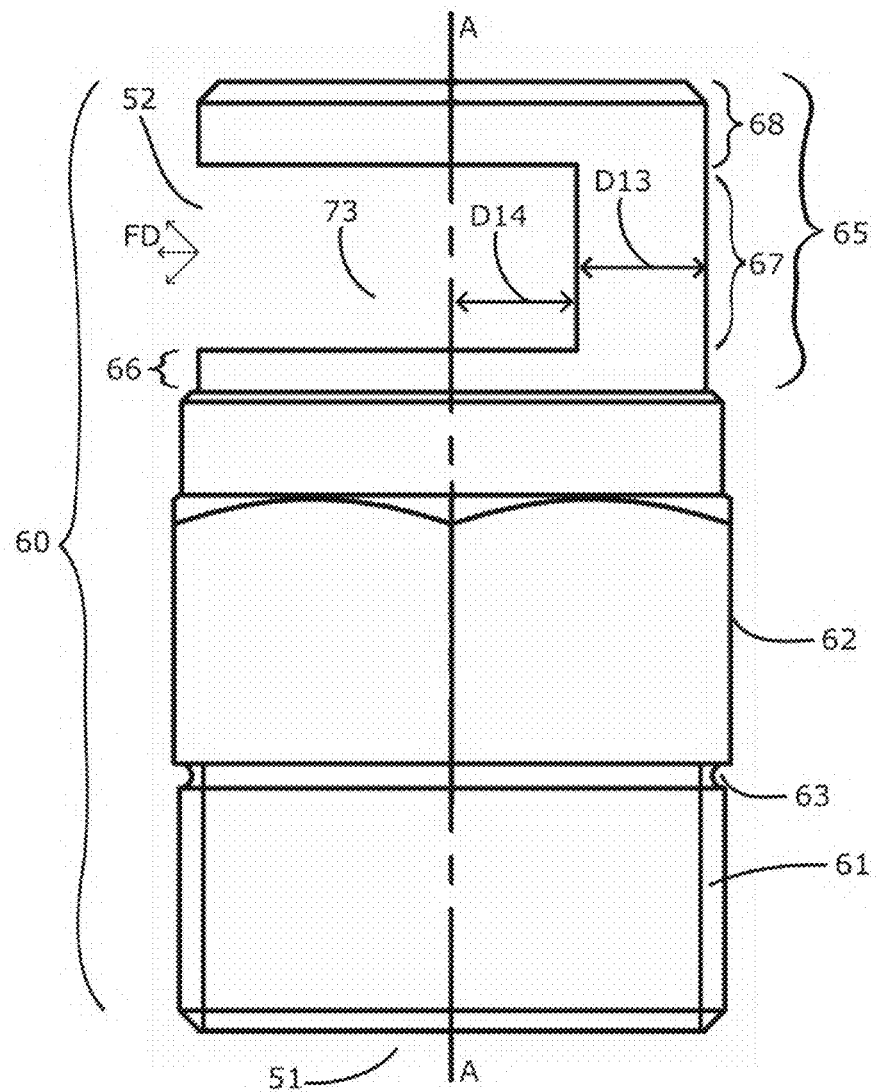
FIG. 4 is a schematic side view of a preferred water spray nozzle for a fire protection system of a rooftop solar panel installation.
Figure 5:
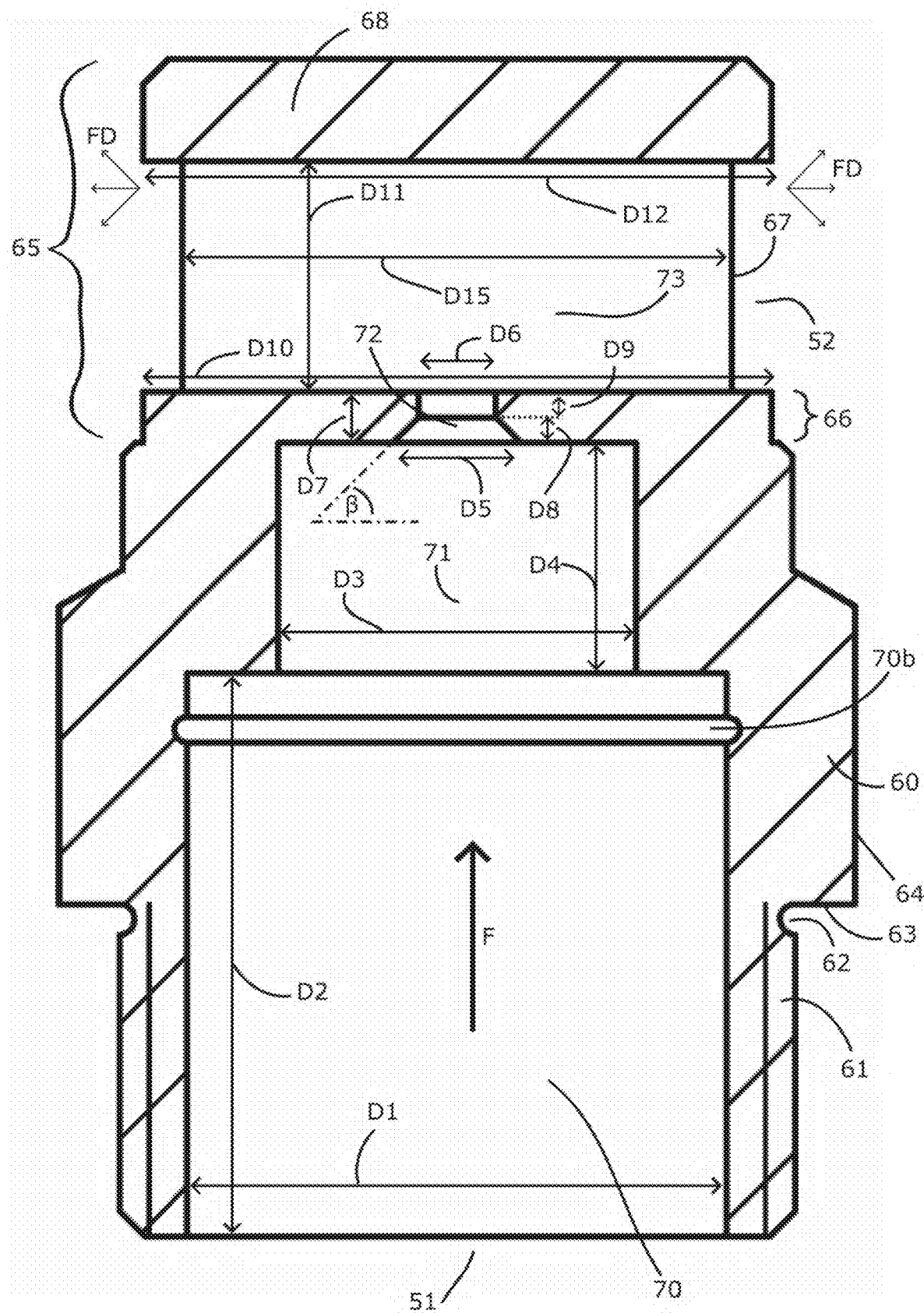
FIG. 5 is a schematic side view of the cross section along A-A of the preferred water spray nozzle of FIG. 4.

FIGS. 4 and 5 show a preferred embodiment of a water spray nozzle for a fire protection system of a rooftop solar panel installation, with FIG. 4 showing a cross section along A-A as indicated in FIG. 3.

The preferred nozzle 50 has a nozzle body 60, a nozzle inlet 51 and a nozzle outlet 52, with inlet 51 and outlet 52 being connected with each other by a fluid passage within the nozzle body. Inlet 51 and outlet 52 are positioned at opposing ends of the nozzle 50, defining a fluid direction F from inlet 51 to outlet 52. The nozzle body 60 has an outer threading 61 on its outside around the nozzle inlet 51, for fastening the nozzle 50 to a corresponding fastening means of a branch pipe 22 (not shown), e.g. a pipe segment with an inner threading of the required size. Adjacent to the outer threading 61 in fluid direction F, the nozzle body 60 has a circumferential gasket groove 62 to receive a gasket and a nozzle seat 63 extending from the groove 62 perpendicular to the fluid direction F, for sealing of the water spray nozzle 50 against the fastening means of the branch pipe 22 after fastening. A torque receiver segment 64 is formed on the outside of the nozzle body 60 extending from the seat 63, preferably with a hexagonal shape, to allow for receiving torque during fastening of the nozzle 50.

From the nozzle inlet 51, a prechamber 70 extends centrally into the nozzle body 60 in fluid direction F. The prechamber 70 is of cylindrical shape and has a constant width D1 over a length D2 into the nozzle body 60. Close to the distal end of the prechamber 70, a circumferential inner groove 70b is formed, designed to house a gasket or a snap ring for fastening an internal insert (not shown). Preferably, the internal insert is a strainer to prevent particles of a given size to clog the nozzle.

A first chamber 71 extends centrally from the circular face of the prechamber 70. The first chamber 71 of this embodiment has a cylindrical shape with a constant width D3 over a length D4. The width D3 of the first chamber is smaller than the width D1 of the prechamber. The prechamber and the first chamber are in full fluid communication at the interface that is formed by their two cross-sectional areas. That means there is no wall or obstacle or protrusion over the full interface with the width D3.

A nozzle head 65 extends on the nozzle body 60 from the torque receiver segment 64 in fluid direction F and surrounds a second chamber 73. The nozzle head 65 includes a base segment 66 adjacent to the torque receiver segment 64, with the base segment 66 being adjoined with the second chamber 73 at a major portion of its circular face with diameter D10 and a first side of the second chamber 73.

The base segment 66 encloses an orifice 72 which fluidly connects the first chamber 71 and the second chamber 73. The orifice 72 is centrally located at the distal face of the first chamber 71 and has an orifice length D7 towards the second chamber 73. The orifice 72 comprises a first, frustoconical segment that is narrowing in fluid direction F, and a second, cylindrical segment. The first segment extends from the first chamber 71 with a radially constant orifice inlet width D5 at an orifice inlet angle β between the face of the first chamber 71 and the confining walls of the orifice. After an orifice inlet length D8, the first segment has an orifice outlet width D6 that stays constant throughout the second cylindrical segment which extends from the first segment for an orifice outlet length D9.

A deflector mount 67 extends from one side of the base segment 66 at the remaining minor portion of its circular face in fluid direction F. The deflector mount 67 has the shape of a cylinder segment with a deflector mount depth D13 ("sagitta" in its circular segment projection) and a deflector mount width D15 ("chord" in its circular segment projection), and confines the second chamber 73 at a second side.

A deflector member 68 extends from the deflector mount 67 in a direction perpendicular to the fluid direction F. The deflector member 68 of this embodiment has a planar face with a circular shape and a width D12, of which a major portion, excluding the minor portion where it is connected to the deflector mount 67, confines the second chamber 73 at a third side. The remaining sides of the second chamber 73 are open and form the nozzle outlet 52.

In this embodiment, the base segment diameter D10 and the deflector member width D12 are identical, and larger than the maximum deflector mount width D15. Further, the major portions of the circular faces of the base segment 66 and the deflector member 68 confining the second chamber 73 are parallel to each other and both perpendicular to the fluid direction F.

A preferred method of fire protection for rooftop solar panel installations includes obtaining a group of water spray nozzles, each of the water spray nozzles including: a hollow nozzle body having a proximal nozzle inlet, a distal nozzle head having a base segment with an orifice, a deflector mount and a deflector member, and a fluid passage within the nozzle body, extending between nozzle inlet and orifice defining a fluid direction; each of the water spray nozzles having a metric K-factor of 20 or less, to discharge firefighting fluid to a distribution area of 1-3 m² per nozzle; and providing the group of water spray nozzles for installation on a roof with solar panels to a fluid pipe system connecting the group of water spray nozzles to a fluid supply for providing firefighting fluid, the passage of the firefighting fluid from the fluid supply to the group of water spray nozzles being controlled by a valve unit in response to an alarm signal generated by a detection control unit of a fire hazard detection system having at least one fire hazard detector and being configured to monitor a coverage area; wherein the coverage area is of at least 500 m² and the group of water spray nozzles is configured to discharge the firefighting fluid received from the fluid supply to the coverage area with a normalized fluid application rate of 15 mm/m²/min or less.

A more preferred method of fire protection for rooftop solar panel installations includes each of the water spray nozzles being of a preferred embodiment thoroughly described within this application. The fire protection system and method therefor of the present invention make use of the same advantages described for the inventive water spray nozzle. Preferred embodiments of the water spray nozzle also constitute preferred embodiments of the fire protection system and the method of supplying a fire protection system, and vice versa.

LIST OF REFERENCES 1 roof
2 roof surface
5 solar panel
6a,6b panel support structure
10,10' fire protection system
11,11' coverage area
15 fire wall
20 fluid pipe system
21,21' main pipe
22 branch pipe
25,25' valve unit
26 fluid supply
30,30 fire hazard detector
31,31' detection control unit
35,35' alarm line
36,36 valve control unit
50 water spray nozzle
50a,b water spray nozzle with first, second orientation
51 nozzle inlet
52 nozzle outlet
60 nozzle body
61 outer threading
62 gasket groove
63 nozzle seat
64 torque receiver segment
65 nozzle head
66 base segment
67 deflector mount
68 deflector member
70 prechamber
70b inner groove
71 first chamber
72 orifice
73 second chamber
F fluid direction
FD fluid discharge direction
L1,2 first, second roof length
L3,4 first, second coverage area length
L5,6 first, second panel dimension
L7,8 first, second nozzle group spacing
L9 nozzle spacing
L10 branch pipe spacing
L11 panel row clearance
L12 panel to fire wall distance
L13 panel to roof distance
H1 first height of solar panel
H2 second height of solar panel
H3 height of water spray nozzle with first orientation H4 height of water spray nozzle with second orientation
H5 height of fire hazard detector
D1 prechamber width
D2 prechamber length
D3 first chamber width
D4 first chamber length
D5 orifice inlet width
D6 orifice outlet width
D7 orifice length
D8 orifice inlet length
D9 orifice outlet length
D10 head base segment width
D11 second chamber length
D12 deflector member width
D13 deflector mount depth
D14 deflector mount distance
D15 deflector mount width
α module tilt
β orifice inlet angle

The invention claimed is:

1. A fire protection system for a rooftop solar panel installation, comprising:
a group of water spray nozzles, each of the group of water spray nozzles having a metric K-factor of 20 or less, to discharge firefighting fluid to a coverage area of the rooftop solar panel installation with solar panels,
a single fluid pipe system connecting the group of water spray nozzles to a fluid supply for providing the firefighting fluid,
a fire hazard detection system with at least one fire hazard detector configured to monitor the coverage area, and at least one detection control unit to generate an alarm signal upon detection of a fire hazard within the coverage area,
a valve unit configured to control passage of the firefighting fluid from the fluid supply to the group of water spray nozzles in response to the alarm signal,
wherein the coverage area comprises at least 500 m$^2$, and the group of water spray nozzles is configured to discharge the firefighting fluid received from the fluid supply to the coverage area with a normalized fluid application rate of 15 mm/m$^2$/min or less, and
wherein each of the water spray nozzles comprises:
a hollow nozzle body having:
a proximal nozzle inlet,
a distal nozzle head having a base segment with an orifice,
a deflector mount,
a deflector member, and
a fluid passage within the nozzle body, extending between nozzle inlet and orifice defining a fluid direction;
wherein the fluid passage includes a first chamber, the nozzle head surrounds a second chamber located between the base segment and deflector member, and the orifice directly connects the first and the second chamber, and
wherein the orifice has an outlet width towards the second chamber, the second chamber has a length between the base segment and the deflector member, and a ratio of outlet width-to-second chamber length is between 0.27 and 0.93.

2. The fire protection system of claim 1, wherein the normalized fluid application rate is 12.75 mm/m$^2$/min or less and the water spray nozzles have a metric K-factor of 17.

3. The fire protection system of claim 1, wherein the normalized fluid application rate is 7.5 mm/m$^2$/min or less and the water spray nozzles have a metric K-factor of 10.

4. The fire protection system of claim 1, wherein the normalized fluid application rate is 3 mm/m$^2$/min or less and the water spray nozzles have a metric K-factor of 4.

5. The fire protection system of claim 1, wherein the coverage area has at least 1000 m$^2$.

6. The fire protection system of claim 5, wherein the coverage area has up to 1600 m$^2$.

7. The fire protection system of claim 1, wherein the water spray nozzles have a minimum nozzle pressure of 1-2 bar.

8. The fire protection system of claim 1, wherein the rooftop solar panel installation is located on a roof with a slope of 15° or less.

9. The fire protection system of claim 1, wherein the deflector mount is laterally distanced from a center of the orifice by a deflector mount distance, and a ratio of outlet width-to-deflector mount distance is between 0.375 and 1.625.

10. The fire protection system of claim 1, wherein a distribution area of each of the water spray nozzles comprises 1-3 m$^2$.

11. The fire protection system of claim 1, wherein each of the water spray nozzles comprises a discharge angle of less than 270°.

12. The fire protection system of claim 1, wherein the ratio of outlet width-to-second chamber length is between 0,33 and 0,73.

13. The fire protection system of claim 1, wherein the ratio of outlet width-to-second chamber length is between 0,33 and 0,52.

14. The fire protection system of claim 9, wherein the ratio of outlet width-to-deflector mount distance is between 0,5 and 1,09.

15. The fire protection system of claim 9, wherein the ratio of outlet width-to-deflector mount distance is between 0,5 and 0,77.

16. A rooftop solar panel installation and fire protection system, comprising:
a plurality of rows of solar panels located on an area of a roof,
a fluid pipe system including a single main pipe and a plurality of branch pipes, each branch pipe being located between an associated row of the plurality of rows of solar panels and the area of the roof, and water spray nozzles provided on each of the plurality of branch pipes to discharge firefighting fluid to a coverage area of at least 500 m$^2$ with a normalized fluid application rate of 3 mm/m$^2$/min to 15 mm/m$^2$/min,
a fire hazard detection system with at least one fire hazard detector configured to monitor the coverage area, and at least one detection control unit to generate an alarm signal upon detection of a fire hazard within the coverage area,
a valve configured to control passage of the firefighting fluid from a fluid supply to the fluid pipe system in response to the alarm signal,
wherein each of the water spray nozzles comprises a metric K-factor of 4 to 20 and includes:
a hollow nozzle body having: a proximal nozzle inlet, a distal nozzle head having a base segment with an orifice, a deflector mount, a deflector member, and a fluid passage within the nozzle body, extending between nozzle inlet and orifice defining a fluid direction;
wherein the fluid passage includes a first chamber, the nozzle head surrounds a second chamber located between the base segment and deflector member, and the orifice directly connects the first and the second chamber, and wherein the orifice has an outlet width towards the second chamber, the second chamber has a length between the base segment and the deflector member, and a ratio of outlet width-to-second chamber length is between 0,27 and 0,93.

17. The rooftop solar panel installation and fire protection system of claim 16, wherein each of the water spray nozzles comprises a metric K-factor of 17 to 20.

18. The rooftop solar panel installation and fire protection system of claim 16, wherein the deflector mount is laterally distanced from a center of the orifice by a deflector mount distance, and a ratio of outlet width-to-deflector mount distance is between 0,375 and 1,625.

19. The rooftop solar panel installation and fire protection system of claim 16, wherein each of the water spray nozzles comprises a metric K-factor of 10 to 12.

20. The rooftop solar panel installation and fire protection system of claim 19, wherein the ratio of outlet width-to-second chamber length is between 0,33 and 0,73.

21. The rooftop solar panel installation and fire protection system of claim 20, wherein the deflector mount is laterally distanced from a center of the orifice by a deflector mount distance, and a ratio of outlet width-to-deflector mount distance is between 0,5 and 1,09.

22. The rooftop solar panel installation and fire protection system of claim 16, wherein each of the water spray nozzles comprises a metric K-factor of 4 to 7.

23. The rooftop solar panel installation and fire protection system of claim 22 wherein the ratio of outlet width-to-second chamber length is between 0,33 and 0,52.

24. The rooftop solar panel installation and fire protection system of claim 23, wherein the deflector mount is laterally distanced from a center of the orifice by a deflector mount distance, and a ratio of outlet width-to-deflector mount distance is between 0,5 and 0,77.

25. The fire protection system of claim 11, wherein the discharge angle comprises 170° to 190°.

26. The rooftop solar panel installation and fire protection system of claim 16, wherein the coverage area of at least 500 m$^2$ comprises 500 m$^2$ to 1600 m$^2$.

* * * * *